US012108466B2

(12) United States Patent
Ong

(10) Patent No.: US 12,108,466 B2
(45) Date of Patent: Oct. 1, 2024

(54) WIRELESS COMMUNICATION COEXISTENCE

(71) Applicant: Comcast Cable Communications, LLC, Philadelphia, PA (US)

(72) Inventor: Ivan Ong, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 303 days.

(21) Appl. No.: 17/676,891

(22) Filed: Feb. 22, 2022

(65) Prior Publication Data

US 2023/0269786 A1  Aug. 24, 2023

(51) Int. Cl.
| H04W 74/0833 | (2024.01) |
| H04B 17/336 | (2015.01) |
| H04W 24/08 | (2009.01) |
| H04W 24/10 | (2009.01) |
| H04W 84/18 | (2009.01) |

(52) U.S. Cl.
CPC ........ *H04W 74/085* (2013.01); *H04B 17/336* (2015.01); *H04W 24/08* (2013.01); *H04W 24/10* (2013.01); *H04W 84/18* (2013.01)

(58) Field of Classification Search
None
See application file for complete search history.

(56) References Cited

U.S. PATENT DOCUMENTS

| 8,547,867 | B2 | 10/2013 | Koo et al. | |
| 9,838,054 | B2* | 12/2017 | Zhao | H04B 17/29 |
| 10,219,319 | B2* | 2/2019 | Schenk | H05B 47/19 |

OTHER PUBLICATIONS

Hauer, Jan-Hinrich, Handziski, Vlado, and Wolisz, Adam. Experimental Study of the Impact of WLAN Interference on IEEE 802.15.4 Body Area Networks. Telecommunication Networks Group. Presented by: Pradeep M. Hettiarachchi. Oct. 11, 2009.
Coexistence in 2.4 GHz. Co-existence of WLAN, Bluetooth®, ZigBee®, and Thread in the 2.4 GHz band. Rev. 2, Nov. 2019.
Nikolich, Paul, et al. "Coesitence Lessons Learned", Date: Nov. 8, 2014. doc.: IEEE 802.19-14/0080r2. Nov. 2014.
Kim, Yena, Lee, SeungSeob, and Lee, SuKyoung. "Coesitence of Zig-Bee-based WBAN and WiFi for Health Telemonitorying Systems". DOI 10.1109/JBHI.2014.2387867, IEEE Journal of Biomedical and Health Informatics. 2013.
Pheng, Xiaolong, et al. "ZiSense: Towards Interference Resilient Duty Cycling in Wireless Sensor Networks". Sensys'14, Nov. 3-5, 2014, Memphis, TN, USA.

(Continued)

Primary Examiner — Hong S Cho
(74) Attorney, Agent, or Firm — Banner & Witcoff, Ltd.

(57) ABSTRACT

Systems, apparatuses, and methods are described for managing wireless communications of multiple wireless devices sharing a wireless communication medium. Noise of the wireless communication medium may be monitored and compared to one or more patterns associated with wireless communications of the wireless devices sharing the wireless communication medium. Based on a feature of the one or more patterns being detected in the noise of the wireless communication medium, a wireless communication attempt may be determined and a power level of the wireless communication medium may be reduced to allow wireless communications to be received.

20 Claims, 6 Drawing Sheets

(56) References Cited

OTHER PUBLICATIONS

Lim, Sangsoon and Seo, Sanghyun. "Towards Interference-Aware ZigBee Transmissions in Heterogeneous Wireless Networks". DOI: 10.32604/cmc.2020.013430. 2020.

UG103.2: Zigbee Fundamentals. Copyright © 2021 by Silicon Laboratories.

* cited by examiner

| Antenna | First noise value (average noise floor) | Second noise value (noise floor at time t) | Differences | Third time length | Pattern detected? |
|---|---|---|---|---|---|
| 1 | -70 dBm | -67 dBm | 3 dB | 2*T3 | Y |
| 2 | -70 dBm | -68 dBm | 2 dB | 4*T3 | Y |
| 3 | -71 dBm | -68 dBm | 3 dB | 2*T3 | N |
| 4 | -71 dBm | -67 dBm | 4 dB | T3 | Y |
| Average | 70.5 dBm | -67.5 dBm | 3 dB | | Y |

FIG. 6A

| Sensor | Location | Threshold, channel(s) | Waiting time period | Wait attempts | Priority |
|---|---|---|---|---|---|
| Door sensor 305a | Living room | +3 dBm, channel: 1 | 5 T3 | 4 | High |
| Motion sensor 305b | Living room | +3 dBm, channel: 16-19 | 4 T3 | 2 | Medium |
| Smart plug 305c | Living room | +5 dBm, channel: Any | 2 T3 | 1 | low |
| Moisture sensor 305d | Front yard | +5 dBm, channel: 16-24 | 2 T3 | 1 | low |
| Window sensor 305e | Bedroom | +3 dBm, channel: 1 | 4 T3 | 2 | Medium |
| Temperature sensor 305f | Bedroom | +5 dBm, channel: Any | 2 T3 | 1 | Low |
| Other sensor 305g | Attic | +5 dBm, channel: Any | 2 T3 | 1 | Low |
| Smoke detector 305h | Attic | +3 dBm, channel: 10-15 | 5 T3 | 4 | High |

FIG. 6B

WIRELESS COMMUNICATION COEXISTENCE

BACKGROUND

Higher power radio wireless communication protocols (e.g., for Wi-Fi 6, 6E), higher gain antennae, higher front end gain, more dense radio placement, smaller form factors of multi-radio devices, etc., limit the extent to which noise (thermal noise, cross-technology interference, etc.) can be reduced for any device in a multi-radio environment. Low-power radio devices (e.g., Internet of Things (IOT) devices) may employ low-powered, near range protocols, such as Zigbee, Z-Wave, Bluetooth Low Energy (BLE), etc., and may share a wireless communication medium with high-power radios. Various solutions for coexistence, such as implementation of quiet time and fairness algorithms such as Packet Traffic Arbitration (PTA), may result in unacceptable amounts of downtime for radios employing high-power protocols, may negatively affecting user experience, and/or may be resource intensive.

SUMMARY

The following summary presents a simplified summary of certain features. The summary is not an extensive overview and is not intended to identify key or critical elements.

Systems, apparatuses, and methods are described for managing wireless communication in a multi-wireless device environment. The multi-wireless device environment may comprise multiple wireless devices each configured to send one or more wireless communications via one or more wireless interfaces. A noise characteristic of a wireless communication medium of the multi-radio environment may be monitored for anomalies. A detected anomaly may trigger increased monitoring of the noise characteristic. Data, based on the increased monitoring of the noise characteristic, may be compared to one or more features of patterns associated with the one or more wireless communications of the wireless devices of the multi-radio environment. Based on the comparison indicating agreement between the data and one or more features of one or more of the patterns, a wireless communication attempt may be determined for one or more of the multiple wireless devices. Wireless communications and/or a power of wireless communications may be reduced for one or more of the wireless devices of the multi-radio environment.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6A shows an example of a table with information that may be used to detect an anomaly.

FIG. 6B shows an example of a table with information that may be used to determine rules for detecting wireless communications.

DETAILED DESCRIPTION

Figure 1:
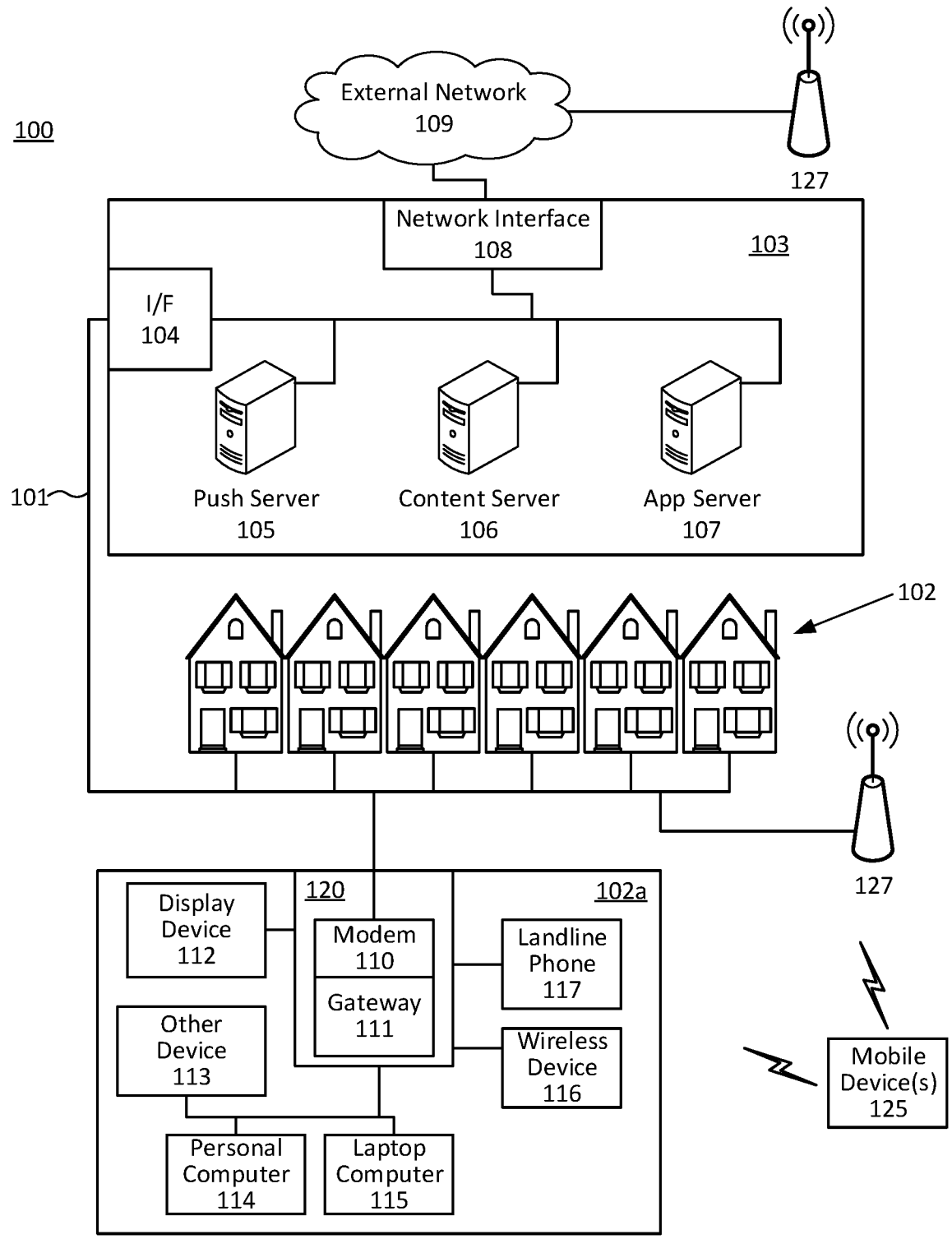
FIG. 1 shows an example communication network in which features described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communication links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol-VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
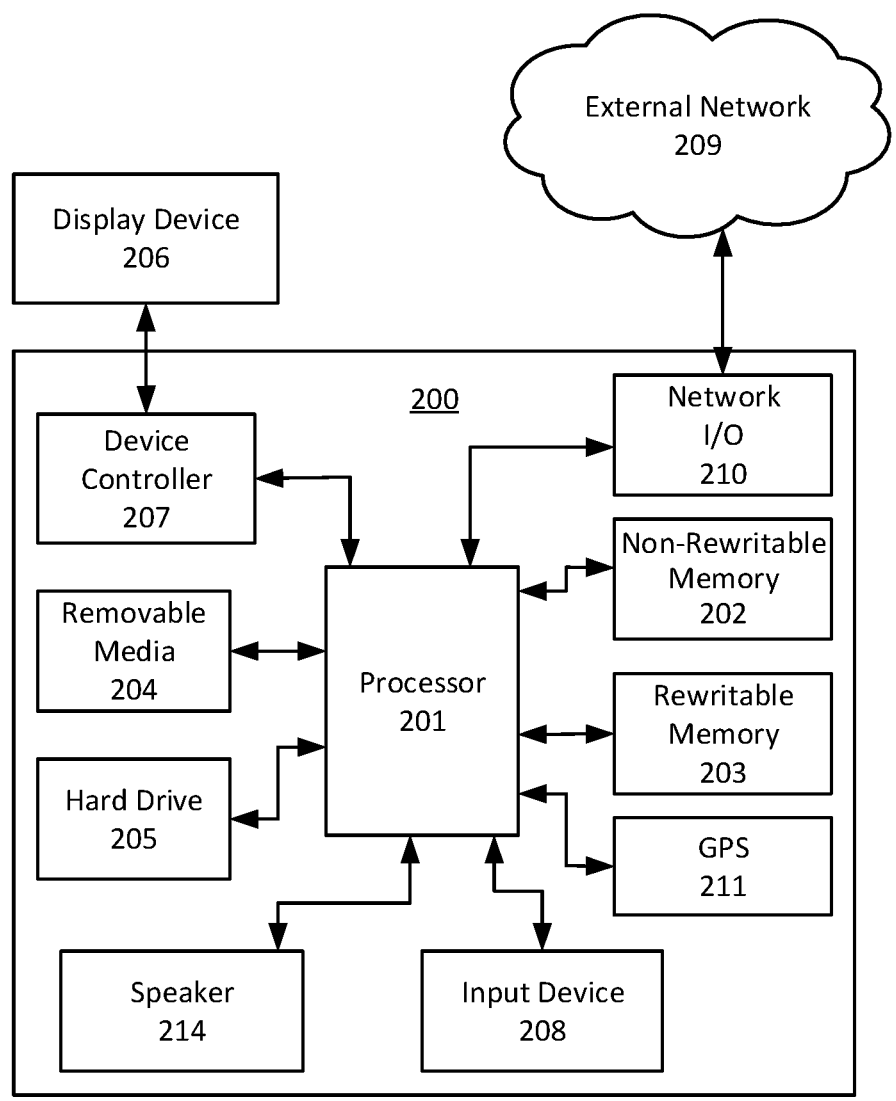
FIG. 2 shows hardware elements of a computing device that may be used to implement any of the various devices described herein.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., any of the devices described in connection with FIG. 3). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface (e.g., a high-power RF interface, a low-power RF interface), or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
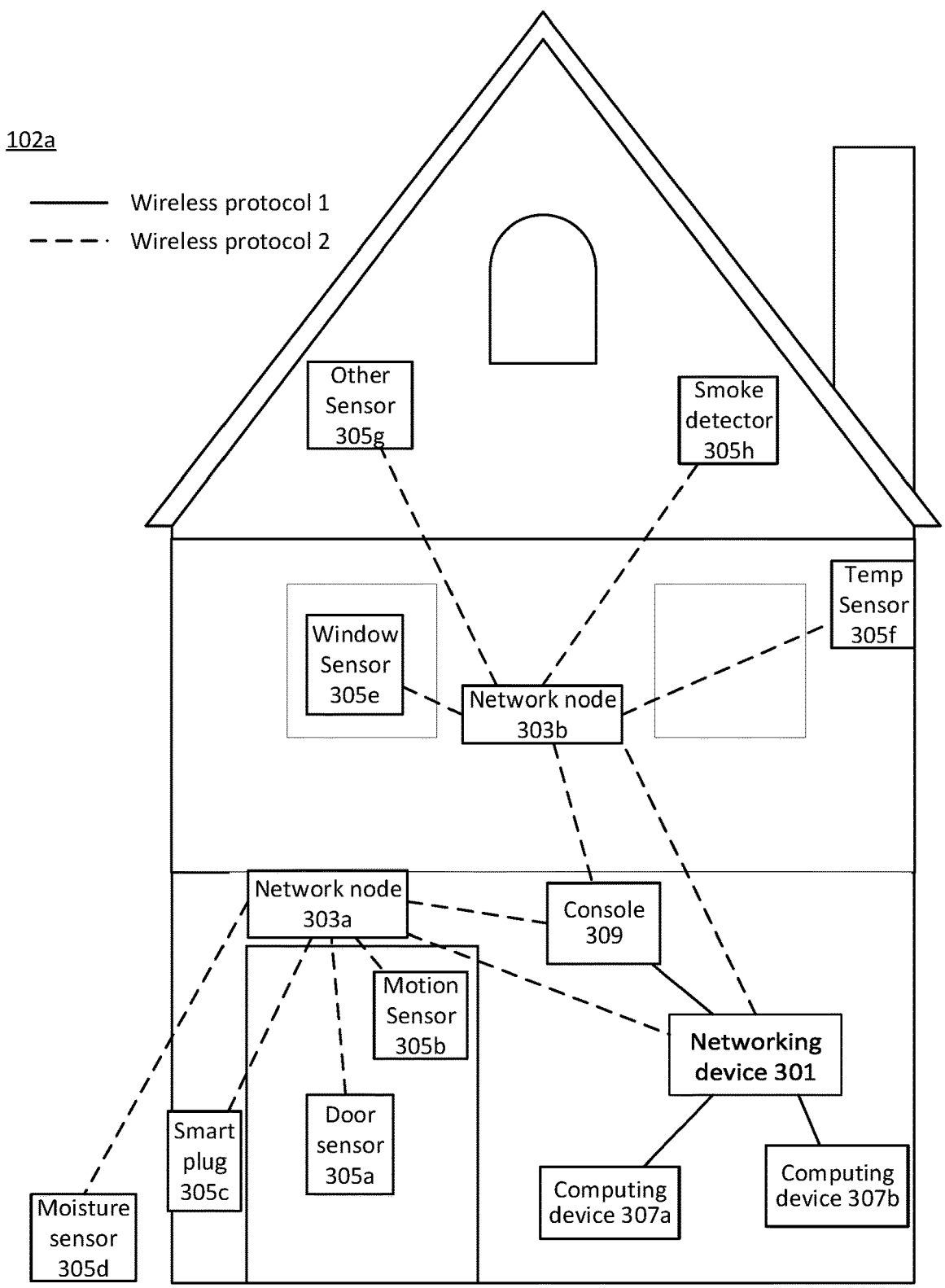
FIG. 3 shows an example multi-wireless device environment and a system for managing wireless communications in the multi-wireless device environment

FIG. 3 shows an example system for managing wireless communication in a multi-wireless interface environment. The system may comprise multiple wireless devices, each having one or more wireless interfaces. The wireless interfaces may comprise transceivers configured to transmit and receive wireless communications over a wireless communication medium. The wireless communication medium may comprise one or more channels (e.g., frequency bands for use in wireless communications, such as 900 MHZ, 2.4 GHz, 3.6 GHz. 4.9 GHZ, 5 GHZ, 5.9 GHZ. 6 GHz and 60 GHz frequency bands provided by the 802.11, and/or channels defined within the frequency bands, such as Wi-Fi channels, Zigbee channels, Bluetooth channels, etc.) for wireless signal propagation, that may have overlapping spectra, such as channels in the industrial, scientific and medical (ISM) frequency bands, or other public or commercial wireless communication frequency bands. The devices may communicate over the wireless communication medium via multiple wireless networks using multiple wireless communication protocols. The multiple wireless networks may comprise one or more of a wireless local area network (WLAN) (e.g., IEEE 802.11 Wi-Fi networks such as Wi-Fi 4, Wi-Fi 5, Wi-Fi 6 and 6E, etc.), a wireless personal area network (WPAN) (e.g., Bluetooth, BLE, IEEE 802.15.1 Bluetooth, IEEE 802.15.4 low-rate WPANs (LR-WPANs) (e.g., Zigbee, Z-wave, 6LoWPAN, Thread), etc.), or another wireless networks that may share the wireless communication medium (e.g., body area networks (BaNs), nanoscale networks, near-field networks, near-me area networks, etc.). One or more of the wireless networks may comprise, or be part of, an IoT network and/or a network for a monitoring system (e.g., a security system, a home automation system, etc.) for the premises 102a.

The multiple wireless devices may comprise a networking device 301, which may be a wireless communication device (e.g., a router, gateway, access point, etc.) such as gateway 111 of FIG. 1. The networking device 301 may comprise multiple wireless interfaces configured to communicate over multiple wireless networks using one or more wireless communication protocols. The solid, dashed and dotted lines in FIG. 3 connecting the various devices may represent wireless connections of multiple wireless networks operating by different wireless communication protocols. Wireless connections of a first network operating by wireless protocol 1 are shown by solid lines and wireless connections of a second network operating by wireless protocol 2 are shown by dashed lines. The networking device 301 may comprise a plurality of wireless interfaces configured to communicate over the first network using wireless protocol 1 and over the second network using wireless protocol 2. Alternatively, or in addition, the networking device 301 may be configured to communicate with one or more other networking device 301s having a plurality of wireless interfaces configured to communicate using one or more of the wireless protocols 1-2 (e.g., the network nodes 303a-b, the console 309, and/or other devices, shown or not, that may perform functions of the networking device 301, as discussed herein). The first network and the second network may communicate via one or more shared and/or overlapping channels of the wireless communication medium. For example, the first network may be a WLAN, with wireless protocol 1 being, for example, a Wi-Fi wireless communication protocol and the second network may be a WPAN, with wireless protocol 2 being a Zigbee wireless communication protocol. The first and second networks may communicate via the same channel and/or overlapping channels of, e.g., the 2.4 GHz ISM band.

The multiple wireless devices may comprise one or more computing devices 307a-b of the first network (such as any of devices 112-116 or mobile device 125 of FIG. 1, and other examples of such devices discussed above). The multiple wireless devices may also comprise one or more wireless devices of the second network. FIG. 3 shows the second network as a mesh network for sensors of a monitoring system at the premises 102a, comprising the network nodes 303a-b and the sensors 305a-h. The networking device 301 may be configured to act as a network coordinator of the second network (e.g., as a Zigbee coordinator), and/or may be communicatively connected to a network coordinator of the second network. The networking device 301 may be communicatively connected to one or more network nodes, such as network nodes 305a-b, which may be capable of sending information received via any of the networking device 301 and/or the sensors 305a-h to any other of the networking device 301 and/or the sensors 305a-h. The sensors 305a-h may be configured to receive wireless communications from, and send wireless communications to, one or more of the network nodes 305a-b with which they are paired. For example, the sensors 305a-h may be communicatively connected to the networking device 301 via one of network nodes 305a-b. The second network may, alternatively or in addition, comprise any other network architecture. For example, one or more of the sensors 305a-h may be configured to communicate directly with the networking device 301, and/or may be configured to receive a wireless communication via a device and send information based on the wireless communication to another device. The second network may comprise other wireless devices, such as a computer, a smartphone, a laptop, a tablet, a set top box, a display device, and/or a low powered electronic device (e.g., an IoT device) such as any other sensor, a smart device, any other security device (electronic camera, smart doorbell, etc.) The multiple devices may also comprise a device for user input, such as a console 309. The console 309 may be configured to receive input via a user interface and provide instructions based on the input to one or more of the networking device 301, the network nodes 303a-b, the sensors 305a-h or the computing devices 307a-b. The console 309 may be installed at the premises, (e.g., as a console of a monitoring system and/or part of any of the networking device 301, the network nodes 303a-b, the sensors 305a-h or the computing devices 307a-b) and/or a mobile device of the one or more mobile devices 125 of FIG. 1 (e.g., a smart phone).

Figure 4:
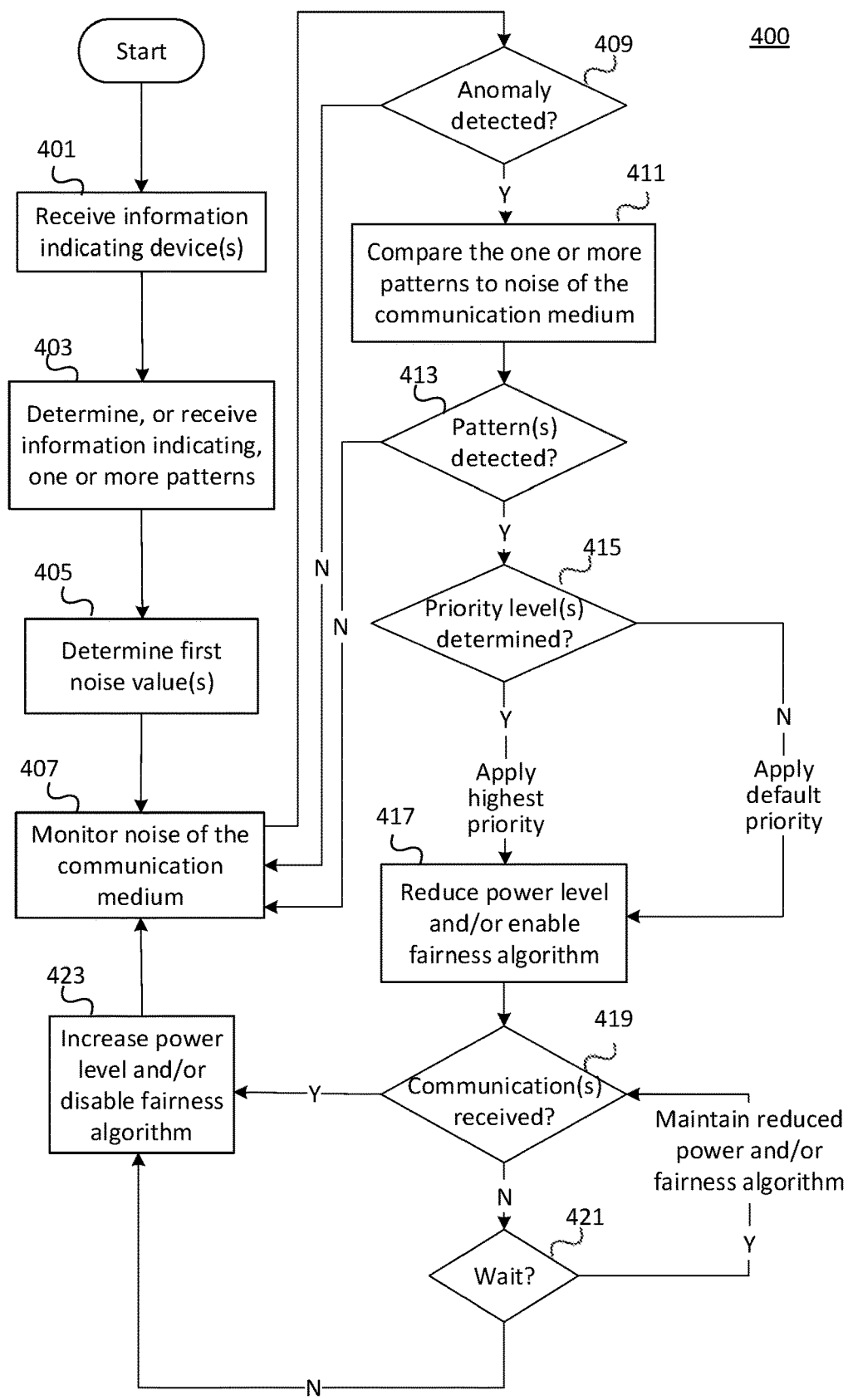
FIG. 4 is a flow chart showing an example method for managing wireless communications in a multi-wireless device environment.

FIG. 4 is a flow chart showing steps of an example method 400 for managing wireless communications in a multi-wireless device environment. For convenience, FIG. 4 is described by way of an example in which the steps are performed by the networking device 301 of the multi-wireless device environment. One, some, or all steps of the example method of FIG. 4, or portions thereof, may be performed by one or more other computing devices (e.g., the network nodes 303a-b, the sensors 305a-h, the computing devices 307a-b, the console 309, a computing device (e.g., a server) in the local office 103 or in the external network 109, etc.). One, some, or all steps of the example method of FIG. 4 may be omitted, performed in other orders, and/or otherwise modified, and/or one or more additional steps may be added.

In step 401, the networking device 301 may receive information indicating one or more wireless devices at or near the premises 102a and may pair with the one or more wireless devices to begin communicating. One or more of the wireless devices may be one or more wireless devices (e.g., one or more of the network nodes 303a-b or the sensors 305a-h) that may be configured to communicate via a low-rate and/or low-power wireless communication protocol (e.g., Zigbee, Bluetooth LE, etc.). One or more of the wireless devices may be one or more other devices (e.g., computing devices 307a-b) configured to communicate via a high-power wireless communication protocol (e.g., Wi-Fi). The networking device may be configured to communicate via a plurality of wireless interfaces comprising one or more first wireless interfaces configured to transmit and receive wireless communications via the low-rate and/or low power wireless communication protocol and one or more second wireless interfaces configured to transmit and receive wireless communications via the high-power wireless communication protocol. The information may be received upon installation of the networking device 301 and/or installation of the one or more wireless devices at the premises 102a. The information may be programmed (e.g., by a manufacturer or user) into a memory of the networking device 301 upon manufacture of the networking device 301, or upon installation of the networking device 301 and/or installation of the one or more wireless devices at the premises 102a, e.g., as part of a network at the premises 102a, such as a network of a monitoring system or an IoT. The information may comprise user input, received via a user interface associated with the networking device 301 and/or at the console 309, which may be configured to provide user input to a network comprising the networking device 301 and/or the one or more the wireless devices 303a-b, 305a-h or 307a-b. For example, the console 309 may be a console for a security or other monitoring system at the premises 102a, and may be configured to provide user input to the networking device 301 and/or the second network.

The information indicating the one or more devices may comprise information indicating a priority level associated with a wireless communication, a wireless communication protocol and/or a wireless device. The priority level may be associated with rules for detecting an associated wireless communication (e.g., a wireless communication associated with the priority level, or a wireless communication of a wireless device or wireless communication protocol associated with the priority level). The priority level may be one of a plurality of priority levels, which may be indicated numerically (e.g., priority level 1, 2, 3, etc.) or qualitatively (e.g., high, medium, low, etc.). A priority level may be set, and/or adjusted from a default priority level, for a wireless communication, a wireless communication protocol and/or a wireless device based on user input and/or additional factors. The additional factors may comprise an alert level of a monitoring system and/or security system associated with the wireless communication, the wireless communication protocol and/or the wireless device, an alert level of the wireless device, a power level of the wireless communication (e.g., a higher power level may be associated with a lower priority level), timing information associated with the wireless communication (e.g., more frequent wireless communications may be associated with a lower priority level), a quality indicator (e.g., a bit error rate) of the wireless communication (e.g., lower quality may be associated with higher priority level), etc.

In step 403, the networking device 301 may determine, and/or receive information indicating, one or more patterns associated with one or more wireless communications of the one or more wireless devices (e.g., the network nodes 303a-b, the sensors 305a-h, etc.). The information indicating the one or more patterns may be received based on (e.g., in response to) a request (e.g., by the networking device 301 or another device) sent to a wireless device of the one or more wireless devices. The request may comprise a request for information indicating a pattern associated with a wireless communication of the wireless device, and/or instructions to send a wireless communication. Based on the instructions, a wireless communication may be sent (e.g., by the wireless device to the networking device 301 and/or to another wireless device). The wireless communication may be received (e.g., by the networking device 301) and a pattern of the wireless communication may be determined based on receipt of the wireless communication. Alternatively, or in addition, a power level of the wireless communication medium may be monitored for a time period based on the instructions (e.g., for a time period after the instructions are sent or for a time period for sending the wireless communication specified in the instructions) and a pattern of the wireless communication may be determined based on the monitored power level, as will be discussed in more detail below. Alternatively, or in addition, the request for information may comprise a request for information indicating one or more features of the wireless communication of the wireless device, such as a packet size (e.g., in bits), data rates (e.g., in bits/seconds), a numbers of packets associated with the wireless communication (e.g., packets sent in groups of 2, 3, 4, 5, etc.), timing features of packets of the wireless communication (e.g., sent periodically every 1 ms, 1 s. 1 min, etc.), a number and timing of repeats of the wireless communication (e.g., repeated 8 times, with repeats occurring every 4 seconds), etc. The request for information may comprise a request for additional information about the wireless communication, such as a wireless communication protocol of the wireless communication, one or more frequency bands or channels associated with the wireless communication and/or the associated wireless communication protocol (e.g., a channel of the wireless communication and/or possible channels defined for the wireless communication protocol), or other timing information for the wireless communication (e.g., a time of day, week, month, etc.

for which the wireless communication may be most likely to occur). The request for information may comprise a request for additional information about the wireless device associated with the wireless communication, such as a device identifier (e.g., an IP address, MAC address, or another device-specific identifier), location information of the wireless device (e.g., a geographic location, a physical distance and/or direction relative to the premises 102*a* or a location at the premises (e.g., relative to a location of the networking device 301), a room of the premises 102*a*, a nearest router or access point, etc.), a wireless communication protocol associated with a wireless interface of the wireless device, etc. Some or all of the additional information may be received without a request for the additional information (e.g., based on other wireless communications with the wireless device). Alternatively, or in addition, the information indicating the pattern and/or the additional information may be received as part of the information indicating the wireless device received in step 401.

The pattern associated with the wireless communication of the wireless device may be determined by monitoring a power level of the wireless communication medium during a time period. The power level may be monitored by measuring one or more of a received signal strength indicator (RSSI), a received channel power indicator (RCPI), a noise floor of the wireless communication medium, or another value based on a power level of signals transmitted and/or detected in the wireless communication medium. Variations in values of the power level during the time period may be determined to correspond to the wireless communication, and information indicating the pattern, and/or features of the pattern, may be determined based on the variations. The wireless communication may be sent one or more times based on instructions to send the wireless communication and/or during other operation of the wireless device. A value of the power level of the wireless communication medium may be determined based on power received by one or more wireless interfaces (e.g., of the networking device 301). The power received by the one or more wireless interfaces may be provided as input to a device capable of measuring a power level of the wireless communication medium, such as a spectrum analyzer. For example, the networking device 301 may comprise, or be in wireless communication with, a spectrum analyzer configured to receive input from one or more of the wireless interfaces of the networking device 301. Power levels may be monitored over a frequency spectrum of the wireless communication medium. Power level values may be determined for each frequency of the spectrum. Alternatively, or in addition, the power level value may comprise an average of power levels over an entire spectrum of the wireless communication medium, or over a portion thereof (e.g., one or more channels associated with one or more of the wireless communication protocols). The power level value may be based on multiple power levels of the wireless communication medium measured at multiple locations and/or at multiple time points. The power level value may be an average, a sum, a correlation, etc. of the power levels measured at the locations and/or time points. For example, the power level may be an aggregate (e.g., average, sum, cross-correlation, etc.) of multiple power levels measured via the multiple wireless interfaces of the networking device 301. The power level may be based on signals transmitted via (and/or otherwise associated with) multiple antennas and/or ports of a wireless device (e.g., of the networking device 301).

The power level value of the wireless communication medium may be determined based on one or more power levels measured during a time period during which the wireless communication occurs. For example, based on the request for the information, one or more power levels of the wireless communication medium may be measured during a time period following the request (e.g., 1 ms, 1 s, 1 minute, etc. following the request being sent) or a time period specified in the request (e.g., beginning at midnight for 1 minute). Alternatively, or in addition, the one or more power level may be measured over a time period during which the wireless communication is determined to be received. For example, the time period may be a time period during which the wireless communication is received via a wireless interface configured to communicate using the wireless communication protocol of the wireless communication. The power level value may be determined during the time period during which the wireless communication is received and based on one or more power levels measured via one or more other wireless interfaces configured to communicate via one or more other wireless communication protocols. The pattern, and/or features of the pattern, may be determined based on the power level of the wireless communication medium during receipt of the wireless communication. Information indicating the determined pattern, and/or the features of the pattern, may be stored with information indicating an associated wireless communication and/or an associated wireless device. For example, the information indicating the pattern, and/or features of the pattern, may be stored in an entry of a database comprising information about the wireless communication and/or the associated wireless device, such as the information received in step 401.

The power level value of the wireless communication medium may be determined during a time period of low traffic and/or low noise in the wireless communication medium. The time period of low traffic and/or low noise may be determined based on historical data. For example, the time period of low traffic and/or low noise may be a time of day, day of the week, etc., that, based on historical data, has lower traffic and/or noise than other times of day, days of week, etc. A time period of low traffic and/or low noise may be caused by reducing and/or stopping wireless communications of one or more other wireless devices and/or the networking device 301, and/or by reducing a power of one or more of the networks at the premises for the time period. For example, the instructions to send a wireless communication sent to the wireless device may comprise instructions to send a wireless communication during a specific time period and instructions to reduce or stop wireless communications during the specific time period may be sent to the one or more other wireless devices and/or computing devices.

Figure 5:
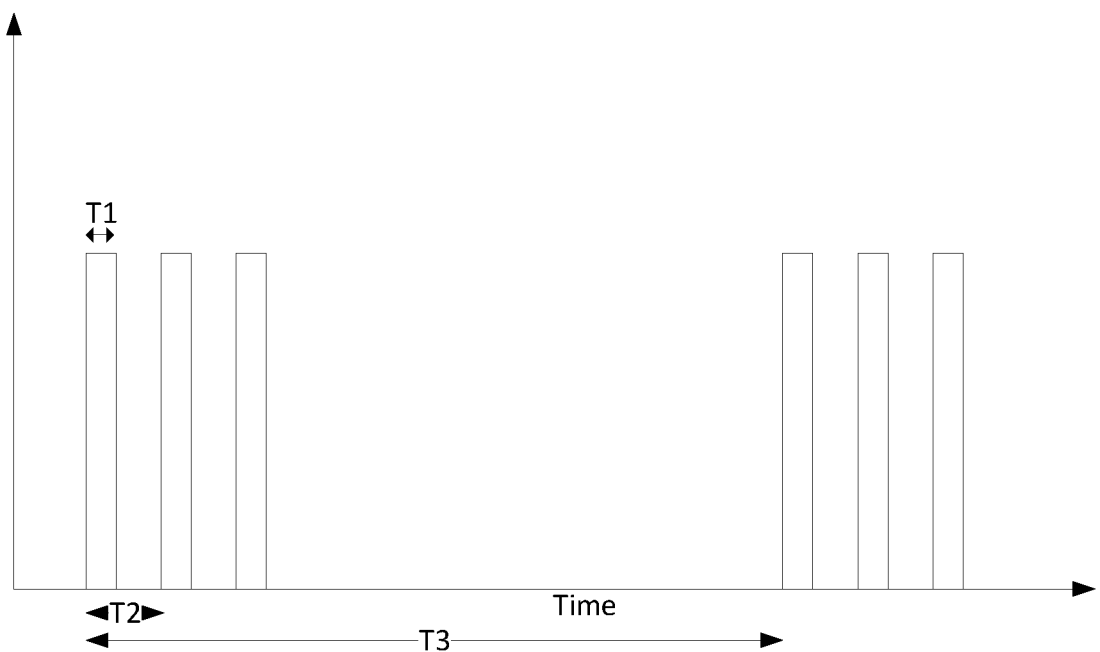
FIG. 5 shows an example of timing features of a pattern that may be associated with a wireless communication

FIG. 5 shows an example timing sequence of a pattern associated with a wireless communication. Features of the one or more patterns, such as the pattern of FIG. 5, may be determined based on the power level value and/or based on one or more received wireless communications. Variations in the power level value, determined during the low noise and/or low traffic time periods, over time may be processed to determine one or more features. For example, the variations in the power level value over time may comprise changes in the power level value by a same amount, changes in the power level that each last a same amount of time, changes in the power level that occur periodically and/or with one or more repeated timing sequences, etc. As shown in the example of FIG. 5, the timing sequence may comprise a series of packets sent at one or more intervals. The pattern may be associated with a wireless communication of one of the wireless devices 305*a-h*, such as a heartbeat message.

The packets may have an on-air time T1 (e.g., based on packet size and data rate of the wireless communication protocol of the wireless communication). The packets may be sent in groups, such as groups of 3, as illustrated in FIG. 5, or any other number of packets (2, 3, 4, 5, 6, etc.), with a first time interval T2 between individual packets in the group. Multiple groups of packets may be sent in the wireless communication, with a second time interval T3 between groups. A finite number of groups of packets may be sent, such as 2, 3, 4, 5, 6, etc., or groups of packets may be sent a until an acknowledgment is received. Timing features, such as the on-air time T1, a packet repetition time T2, a packet group repetition time T3, a number of packets per group, a number of repeated groups, etc. may be determined from the power level of the wireless communication medium measured during the low-traffic and/or low-noise time period. The power level of the wireless communication medium may be processed by signal recognition techniques (edge detection, peak detection, thresholding, auto-correlations, etc.) to determine the timing features T1, T2, T3, etc.

The information indicating the one or more patterns may comprise information indicating timing features of the one or more patterns, as above, and/or spectral features of the one or more patterns. A spectral feature of a pattern may be one or more frequency bands over which the one or more wireless communications associated with the pattern may be sent. The one or more frequency bands may be one or more channels associated with a wireless communication protocol of the wireless communication. The information indicating the one or more patterns may comprise information indicating a combination of timing features and spectral features of the one or more patterns. For example, a pattern may comprise a sequence of pulses that occur within a same frequency band or simultaneously within multiple frequency bands that do not change over time. Such a pattern may be associated with a wireless communication sent over a single channel of a wireless communication protocol (such as a Wi-fi channel or a Zigbee channel), or over multiple channels of the wireless communication protocol that uses direct-sequence spread spectrum (DSSS). A pattern may comprise a sequence of pulses that occur in different frequency bands over time. Such a pattern may be associated with a wireless communication of a wireless communication protocol that uses frequency hopping spread spectrum (FHSS), for example. The timing and/or spectral features may be determined based on receipt of one or more repetitions of the wireless communication (e.g., based on an average, a sum, a correlation, etc. of power levels measured during repetitions of the wireless communication). Multiple patterns may be determined from wireless communications associated with multiple wireless devices during the time period of low noise and/or low traffic of the wireless communication medium.

Additional features of a pattern may comprise a time period (e.g., of a day, a week, a year, etc.), during which the wireless communication is likely to occur (e.g., relative to another time of day, week, year, etc.), and/or expected to occur (e.g., at a specific time or series of times every day, or within a window of an event, such as a polling message or other wireless communication being sent and/or received). Alternatively, or in addition, the additional features of the pattern may comprise a one or more amplitudes (e.g., one or more RCPIs, one or more RSSIs, one or more signal to noise ratio (SNR), etc.) of the wireless communication determined at one or more locations of the premises 102a, etc.

In step 405, the networking device 301 may determine one or more first noise values associated with noise of the wireless communication medium during one or more first time periods. The one or more first noise value may be determined based on a noise level of the wireless communication medium measured at a first rate during the one or more first time periods. The noise level may be measured based on a power received by one or more wireless interfaces that are in an idle state (e.g., not receiving or transmitting a wireless communication) during the measurement. The noise level may be calculated as an RSSI, an RCPI, a noise floor, or another value based on a power level of the wireless communication medium. The one or more first noise values may be determined based on one or more noise levels measured via a plurality of wireless interfaces, such as the wireless interfaces of the networking device 301, and/or one or more wireless interfaces of the networking device 301 and one or more other wireless interfaces of a device communicatively connected to the networking device 301. The one or more first noise values may comprise a plurality of noise level measurements based on power of the wireless communication medium received by the plurality of wireless interfaces and/or a combination of the noise level measurements (e.g., an average, a sum, a difference, a correlation over time data of the noise level, a correlation over spectral data of the noise level, etc.). The one or more first noise values may comprise first noise values for different frequencies over an entire spectrum of the wireless communication medium, and/or over a portion thereof (e.g., over one or more frequency bands, such as one or more channels of the wireless communication medium). Alternatively, or in addition, the one or more first noise values may comprise an average of the first noise values for the different frequencies over the entire spectrum of the wireless communication, and/or over the portion thereof. The one or more frequency bands may be selected according to input (e.g., user input) at an interface, such as an interface of the console 309. The one or more frequency bands may be selected based on the information received in steps 401 and/or 403, such as information indicating one or more wireless communication protocols and/or one or more wireless communications of the one or more wireless devices. The one or more frequency bands may correspond to one or more channels (e.g., Zigbee channels, Bluetooth channels, Wi-Fi channels, etc.) associated with the one or more wireless communication protocols and/or the one or more wireless communications.

The one or more first time periods may have a first length of time (e.g., one or more milliseconds, one or more seconds, one or more minutes, one or more hours, etc.) and may be associated with (e.g., occur during) one or more first time frames. The one or more first time frames may be periodic time frames, such as once/minute, once/hour, once/day, etc. The one or more first time frames may comprise a time frame relative to a day (e.g., morning, evening, noon-1 p.m. local time, etc.), a time frame relative to a week (e.g., specific day of the week, a week day, a weekend day), a time frame during a year, etc. The time frames may be selected based on historical data. The one or more time frames may comprise a time frame associated with high traffic and high noise of the wireless communication medium and/or a time frame associated with low traffic and low noise of the wireless communication medium.

The first length of time may be based on timing features of the one or more patterns determined, or indicated in the information received, in step 403. For example, the first length of time may be based on a timing feature of a pattern of the one or more patterns, such as T1, T2 or T3 of the pattern shown in FIG. 5. The first length of time may be a multiple of a time scale of the timing features (e.g., 1, 2, 3, 4, etc. times T1, T2 or T3). The first length of time may be based on a combination of timing features of different patterns of the one or more patterns, such as an average on-air time T1, a maximum repetition period T3, etc. The first rate may be selected based on a timing feature of the one or more patterns. For example, the first rate may be based on a longest timing feature of a pattern, or a typical (e.g., average) longest timing feature of the one or more patterns. The first rate may be based on user input and/or the first time length (e.g., at least 3 measurements during the first time length). The one or more time frames may be selected based on other timing information of one or more wireless communications. For example, the one or more time frames may be selected to correspond to a time of day, week, month, etc., that a wireless communication is likely to occur.

The one or more first noise values may be stored (e.g., in a database) in a storage of, or accessible to, the networking device 301. The one or more stored first noise values may be updated periodically based on new first noise values. For example, a stored first noise value may correspond to a noise level determined during a first time frame that may occur periodically (e.g., a Monday). A new first noise value may be determined during a next occurrence of the first time frame (e.g., a next Monday morning). The stored first noise value may be updated by being replaced by the new first noise value or being averaged with the next the first noise value, etc. Alternatively, or in addition, the one or more first noise values may be updated by storing the new first noise value with the stored first noise value (e.g., in an entry of the database for Monday morning noise values).

In step 407, the networking device 301 may monitor the noise of the wireless communication medium by determining one or more second noise values associated with the noise of the wireless communication medium. The one or more second noise values may be determined similarly to the one or more first noise values, but during one or more second time periods. The one or more second noise values may be determined based on periodic measurements (e.g., sampling) of the noise level at a second rate (e.g., once per millisecond, once per second, once per minute, etc.) during the one or more second time periods. The second rate may be based on one or more timing features of the one or more patterns determined or indicated in the information received in step 403. For example, the second rate may be based on an on-air time T1 of a pattern of the one or more patterns (e.g., a second rate of 2/T1, 3/T1, etc.), or based on an average (e.g., mean, median or mode) on-air time of the one or more patterns. Alternatively, or in addition, the second rate may be based on user input (e.g., received via the console 309) and/or a second time length of the one or more second time periods (e.g., at least 3 measurements during a second time length). The second rate may be the same as or greater than the first rate. The one or more second time periods may comprise time after one of the one or more first time periods. The second noise values may be stored in a storage of, or accessible to, the networking device 301.

The noise of the wireless communication medium may be monitored by comparing the one or more second noise values with one or more first noise values selected from the one or more first noise values determined in step 405. The comparing may comprise determining one or more differences between the one or more second noise values and one or more first noise values. For example, a first noise value may be selected for comparing with the one or more second noise values based on a correspondence between a first time period associated with the first noise value and the one or more second time periods. The first noise value may be selected based on being associated with a first time period that is nearest in time to the one or more second time periods. Alternatively, or in addition, the first noise value may be selected based on being associated with a first time period that shares one or more properties with the second time period, such as a time of day, a day of the week, a security setting at the premises 102a during the time periods (e.g., triggered, alert, idle), a state of one or more of the sensors 305a-h during the time periods (e.g., triggered, active, idle), etc. For example, the one or more second time periods may occur during a Monday morning (e.g., from 8 a.m. to 10 a.m. on the Monday morning). A first noise value may be selected for comparison with the one or more second time periods based on being determined during a first time period that occurred during a prior Monday morning (e.g., from 8 a.m. to 10 a.m. on a prior Monday morning) or at an earlier time during the Monday morning (e.g., from 7 a.m. to 8 a.m. on the Monday morning). The one or more first time periods may comprise multiple first time periods that correspond to multiple previous Monday mornings (e.g., from 8 a.m. to 10 a.m. for the previous four Monday mornings). The first noise value may be selected based on an association with a most recent of the multiple previous Monday mornings (e.g., the most recent prior Monday morning) or based on being a combination (e.g., an average) of first noise values associated with the multiple previous Monday mornings.

A first noise value may be selected for comparing with a second noise value of the one or more second noise values, based on the first noise level and the second noise level sharing an association with one or more wireless interfaces. For example, the one or more second noise values may comprise a second noise value associated with a first wireless interface (e.g., determined based on noise levels measured via a first wireless interface of the networking device 301) and a second noise value associated with a second wireless interface (e.g., determined based on noise levels measured via a second wireless interface of the networking device 301). A first noise value associated with the first wireless interface may be selected for comparing with the second noise value associated with the first wireless interface and a first noise value associated with the second wireless interface may be selected for comparing with the second noise value associated with the second wireless interface. Alternatively, or in addition, the one or more second noise values may comprise a second noise value determined based on an average of noise levels measured at the first wireless interface and at the second wireless interface. A first noise value may be selected for comparing with the second noise value based on being determined based on an average of noise levels measured via the first wireless interface and via the second wireless interface.

The one or more second noise values may comprise one or more time series of second noise values determined based on noise levels measured over the second time period. The one or more time series of the second noise values may comprise two or more time series of second noise values based on noise levels measured via two or more wireless interfaces (e.g., two or more of the wireless interfaces of the networking device 301) during the second time period. Alternatively, or in addition, the one or more time series of second noise values may be based on averages of noise levels measured via the two or more wireless interfaces during the second time period. One or more first noise values may be selected to compare with the one or more time series of second noise values, as described above. Second noise values in a time series of the one or more time series may be compared to a selected first noise value by determining a difference between the one or more second noise values in the selected first noise value. A time series of differences between the second noise values and a selected first noise value may be determined. Differences may be determined between each of the second noise values and a selected first noise or for a subset of the second noise values and the selected first noise value (e.g., every nth second noise value of the time series of second noise values, where n may be 2, 3, 4, etc.).

In step 409, the networking device 301 may determine, based on the one or more differences between the one or more second noise values and the one or more first noise values determined in step 407, whether an anomaly in the noise of the wireless communication medium is detected. The networking device 301 may receive and/or store rules for detecting an anomaly in the noise of the wireless communication medium. The rules may indicate one or more criteria that, if satisfied by the one or more differences between the one or more second noise values and the one or more first noise values, may indicate an anomaly in the noise of the wireless communication medium. The rules may comprise rules for comparing the one or more criteria to the one or more differences. The rules may comprise a rule to compare the one or more criteria to each of the one or more differences, and/or a rule to compare the one or more criteria to a subset of the one or more differences (e.g., every nth difference, where n is 2, 3, 4, etc.). The rules may comprise a rule to compare the one or more criteria to the one or more differences based on the one or more differences being determined (e.g., in response to the one or more differences being determined). The rules may comprise one or more rules to compare to the one or more criteria periodically (e.g., once per second, once per minute, once per hour, etc., and/or for one second every minute, for one minute every hour, etc.), and/or conditionally (e.g., based on one or more conditions occurring). The one or more conditions may comprise an indication that one or more expected wireless communications were not received (e.g., by a low-power wireless interface of the networking device 301). The networking device 301 may fail to receive one or more heartbeat messages associated with one of the network nodes 303*a-b* or one of the sensors 305*a-g*, an acknowledgement message in response to a message sent to one of the network nodes 303*a-b* or one of the sensors 305*a-g* and/or a response to a polling message sent to one of the sensors 305*a-g*. Based on the rules and the failure to receive the one or more expected heartbeat messages, the acknowledgment message and/or the response to the polling message, the networking device 301 may compare the one or more criteria to the one or more differences (e.g., until the expected message is received, for one or more minutes, one or more hours, etc. after the expected message was determined to not be received, etc.). Other conditions of the one or more conditions may be based on an alert level of a monitoring and/or security system at the premises 102*a* (e.g., set according to user input received via the console 309) and/or a status of a wireless device of the monitoring and/or security system (e.g., an idol, active, and/or triggered status of any of sensors 305*a-h*). For example, the one or more criteria may be compared to the one or more differences between the one or more second noise values and the one or more first noise values based on an elevated alert level of the monitoring and/or security system. Alternatively, or in addition, the one or more criteria may be compared to the one or more differences at a rate that is based on the alert level of the monitoring and/or security system and/or the status of the wireless device. For example, the rules may comprise a rule that the one or more criteria be compared to the one or more differences between the one or more second noise values and the one or more first noise values at a first rate based on a high alert level of the monitoring system and/or security system, or at a second rate based on a low alert level of the monitoring system and/or security system. The first rate may be greater than (e.g., more frequent, for more time, and/or for a greater proportion of the one or more differences) than the second rate.

The networking device 301 may compare the one or more criteria to the one or more differences between the one or more second noise values and the one or more first noise values based on the rules. Based on the comparison, the one or more criteria may be determined to be satisfied and an anomaly in the noise may be detected (409—Y). Based on the comparison, the one or more criteria may be determined to not be satisfied and an anomaly in the noise may not be detected (409—N). The one or more criteria may comprise a criterion that a difference between the one or more second noise values and the one or more first noise values satisfy a threshold. The networking device 301 may compare the one or more differences to the threshold. If one of the one or more differences satisfies (e.g., is greater than or equal to) the threshold, the networking device may determine that an anomaly is detected (409—Y). If none of the one or more differences satisfy the threshold, the networking device 301 may determine that an anomaly is not detected (409—N) and continue to monitor the noise of the wireless communication medium according to step 407. The threshold may be based on the one or more first noise values (e.g., a percentage of a first noise value or of an average of the one or more first noise values, such as 1%, 2%, 3%, etc.). The threshold may be based on information received in step 401, such as a power level associated with a wireless communication protocol and/or a wireless communication. The one or more criteria for detecting an anomaly may comprise one or more criteria that one, a plurality, a majority, an average (e.g., mean, median, mode, weighted average, etc.), and/or all of the one or more differences between the one or more second noise values and the one or more first noise values satisfy the threshold.

The one or more criteria may comprise criteria that multiple differences, of a time series of differences determined based on a time series of second noise values and a first noise, satisfy a threshold. For example, the one or more criteria may comprise a minimum number of the differences of the time series of differences that satisfy a threshold, a minimum number of consecutive differences that each satisfy a threshold, a minimum number of consecutive differences for which an average satisfies a threshold, a minimum percentage of a set of consecutive differences that satisfy a threshold, etc. For example, a time series of second noise values may comprise a time series of noise level measurements determined every millisecond. The time series of second noise values may comprise a set of consecutive noise level measurements of (−70 dBm, −70 dBm, −68 dBm, −67.5 dBm, −68 dBm, −67 dBm, −68 dBm, −70 dBm, −70 dB). The first noise value may be a time-averaged noise floor measurement of −70 dBm. A time series of differences between the second noise values and the first noise value may be: (0 dBm, 0 dBm, 2 dBm, 2.5 dBm, 2 dBm, 3 dBm, 2 dBm, 0 dBm, 0 dB). The one or more criteria may comprise a criterion that a threshold be satisfied for at least 3 ms. Based on a threshold value of 3 dBm, an anomaly may not be detected in the time series of differences (409—N). Based on a threshold value of 2 dBm, an anomaly may be detected by the fifth time point in the time series (e.g., based on the third through fifth differences all satisfying the threshold). Alternatively, or in addition, the one or more criteria may comprise a criterion that the threshold be satisfied by an average of differences between the second noise values and the first noise value over at least 3 ms. Based on a threshold value of 2.5 dBm, an anomaly may be detected by the sixth time point in the time series (e.g., based on the fourth through sixth differences). Alternatively, or in addition, the one or more criteria may comprise a criterion that the threshold be satisfied by at least two out of three consecutive measurements. Based on a threshold value of 2.5 dBm, an anomaly may be detected by the sixth time point in the time series (e.g., based on the fourth through sixth differences). Alternatively, or in addition, the one or more criteria may comprise a criterion that the threshold be satisfied by differences corresponding to measurements taken at time points spaced apart by a predefined time spacing. The predefined time spacing may be based on one or more wireless communication protocols, (e.g., time spacings of retry mechanisms of Zigbee protocols, BLE protocols, etc.). The predefined time spacing may be a uniform predefined time spacing, or a varied predefined time spacings (e.g., exponentially increasing time spacings). The criterion may also require that at least one difference corresponding to a time point between the time points not satisfy the threshold.

The one or more criteria may comprise criteria that a threshold be satisfied by a difference between a second noise value and a first noise value associated with a specific wireless interface and/or by multiple differences between multiple second noise values and a first noise value corresponding to multiple wireless interfaces (e.g., of the networking device 301). For example, a plurality of second noise values may be determined based on noise level measurements of the wireless communication medium at each of a plurality of wireless interfaces. A plurality of differences corresponding to the plurality of wireless interfaces may be differences between the plurality of second noise values and a first noise value. The one or more criteria may comprise criteria that a minimum number of the plurality of differences satisfy a threshold; that an average of the plurality of differences satisfy the threshold, that an average of a minimum number of the plurality of differences satisfy the threshold, that one or more differences corresponding to one or more specific wireless interfaces of the plurality of wireless interfaces satisfy the threshold, etc. An average of the plurality of differences corresponding to the plurality of wireless interfaces may be a weighted average, where the weighting may be based on one or more of receiver sensitivities of the wireless interfaces (e.g., higher weight for higher sensitivity), SNRs of the wireless interfaces (e.g., higher weight for higher SNR), a location of the wireless interfaces (e.g., higher weight for wireless interfaces closer to locations or directions of known wireless devices, higher weight for wireless interfaces closer to locations or directions associated with higher priority wireless devices and/or communications), a wireless communication protocol associated with the wireless interfaces (e.g., higher weight for wireless communication protocols associated with higher power levels and/or higher priorities (e.g., of the wireless communication protocol, an associated wireless communication, and/or an associated wireless device), higher weight for wireless communication protocols associated with frequency bands overlapping one or more frequency bands of wireless communications to be detected (with higher weight for higher priorities of wireless communications to be detected)), etc.

FIG. 6A shows a table including example first noise values, second noise values and differences between the second noise values and first noise values corresponding to noise levels measured via four antenna of four wireless interfaces (e.g., of networking device 301). The one or more criteria may comprise a criterion that differences between second noise values and first noise values corresponding to each of antennae 1-4 satisfy a threshold. Based on a threshold of 2 dBm, an anomaly may be detected. Based on an a threshold of 3 dBm, an anomaly may not be detected. The one or more criteria may comprise a criterion that differences corresponding to at least two of the four antennae satisfy a threshold. Based on a threshold of 3 dBm, an anomaly may be detected. Based on a threshold of 4 dBm, an anomaly may not be detected. The one or more criteria may comprise a criterion that an average over at least three of the antennae 1-4 satisfy a threshold. Based on a threshold of 3, an anomaly may be detected. The one or more criteria may comprise a criterion that a difference corresponding to antennae 1 and 2 satisfy a threshold. Based on a threshold of 2, an anomaly may be detected. Based on a threshold of 3, an anomaly may not be detected.

The one or more criteria may comprise a combination of any of the criteria discussed above, and may be based on information received in step 401, such as timing features of the one or more patterns, spectral features of the one or more patterns, a number of wireless interfaces associated with the one or more second noise values and the one or more first noise values, properties of the wireless interfaces associated with the one or more second noise values and the one or more first noise values, etc. For example, the one or more criteria may comprise a criterion that a difference satisfying a threshold correspond to one or more frequency bands or channels indicated in the information received in step 401. Additionally, or alternatively, the one or more criteria may comprise a criterion that a difference between one or more second noise values and a first noise value associated with one or more high-power wireless interfaces satisfy a threshold. Additionally, or alternatively, the one or more criteria may comprise criteria for detecting anomalies based on priority levels associated with the one or more devices and/or the one or more wireless communications indicated by the information in step 401. Based on a higher priority level associated with a device, an anomaly associated with a wireless communication of the device may be detected based on a lower threshold being satisfied.

FIG. 6B shows a table comprising an example of information associated with the sensors 305a-305h, such as may be received in step 401. The information in the table of FIG. 6B may be used to determine rules for detecting a wireless communication associated with a sensor of the sensors 305a-305h. The information shown in FIG. 6B comprises, for each sensor 305a-305h, a location at the premises 102a, a threshold and one or more channels of the wireless communication that may be used as criteria for detecting an anomaly associated with a wireless communication of the device, a waiting time period (e.g., a time period for reducing power to receive a wireless communication, as will be discussed below) provided in terms of a longest timing feature of the wireless communication T3, a number of wait attempts (a number of times to wait to receive the wireless communication, as will be discussed below), and a priority level of high, medium or low. Based on one or more differences between second noise values and a first noise value satisfying a threshold over the one or more channels (e.g., Zigbee channels) associated with one of the sensors 305a-305h, an anomaly may be detected and associated with the associated sensor. For example, one or more differences between one or more second noise values and a first noise value may be greater than 3 dBm in a frequency band consistent with channel 1 of the wireless communication medium. The one or more differences may satisfy criteria for detecting an anomaly that may be associated with the door sensor 305a and the window sensor 305e in step 409, and may not satisfy criteria for detecting any other sensor and only patterns consistent with, and/or associated with, wireless communications of the door sensor 305a and the window sensor 305e may be considered in the following step 411.

In step 411, based on an anomaly being detected in step 409 (409—Y), the networking device 301 may compare the one or more patterns, determined or indicated in the information received in step 403, to noise of the wireless communication medium. The one or more patterns may be compared to the noise of the wireless communication medium by being compared to one or more of the one or more second noise values, one or more third noise values (described below), differences between the one or more second noise values and a first noise value or differences between the one or more third noise value and a first or second noise value.

The second noise values may be stored second noise values determined, as described above, in step 407. The differences between the one or more second noise values and the first noise value may comprise the one or more differences between the one or more second noise values and the first noise value determined in step 407 and/or additional differences between the one or more second noise values and a first noise value determined based on the anomaly being detected. For example, in step 407, differences between a subset of the one or more second noise values and a first noise value may have been determined (e.g., differences may have been determined between every nth second noise value and a first noise value, where n=2, 3, 4, 5, etc.). Based on the anomaly being detected in step 409, additional differences between stored second noise values, for which a difference was not previously determined in step 407, and a first noise value may be determined in step 411. The additional differences may be differences between a subset of the stored second noise values and the first noise values. A number or frequency of the additional differences determined may be based on an alert level of a monitoring system and/or security system, or a status of a sensor of the monitoring system.

The one or more third noise values associated with the noise of the wireless communication medium may be determined similarly to the one or more first noise values and/or the one or more second noise values, but during a third time period. The third time period may have a third time length and may comprise time after one of the one or more second time periods. The third noise value may comprise noise level measurements determined at a third rate. The third rate may be greater than, or equal to, the first rate and/or the second rate. The third rate may be determined (e.g., selected by the networking device 301) based on one or more timing features of the one or more patterns, such as a shortest timing feature (e.g., an on-air time of a packet, T1, of the pattern shown in FIG. 5). For example, the third rate may be determined to be a sampling rate sufficient to detect the shortest timing feature (e.g., satisfying the Nyquist criterion, 2/T1, 3/T1, 4/T1, etc.). The third time length may be determined based on a longest timing feature of the one or more patterns, such as T3 in the pattern shown in FIG. 5 (e.g., T3, 2*T3, 3*T3, etc.). The third time length may, alternatively, or in addition, be determined based on a size of the anomaly detected in step 409. The third time length may be determined to be smaller based on a larger anomaly and larger based on a smaller anomaly. For example, in FIG. 6A, anomalies may have been detected based on the differences between the second noise values and the first noise values corresponding to the antennae 1-4 ("Differences" column). Third noise values corresponding to each of the antennae 1-4 may be determined based on noise levels measured via each of the antennae 1-4 during one or more third time periods. The one or more third time periods may have third time lengths indicated in the "Third time length" column of FIG. 6A. FIG. 6A shows longer third time lengths corresponding to smaller differences between the second noise values and the first values.

The third time period may be determined based on a time point associated with the detected anomaly (e.g., a time point at which the detected anomaly occurred). For example, the third time period may begin after the time point associated with the detected anomaly and may comprise a second time point that differs from the time point by a length of time based on one or more timing features of a pattern of the one or more patterns. For example, based on an anomaly at a time point t, and based on timing features of a pattern shown in FIG. 5, a third time period may be selected to comprise time points of t+T3, t+2*T3, etc. For an anomaly in the noise caused by a wireless communication associated with the pattern shown in FIG. 5, similar anomalies may occur during the third time period selected to comprise the time points of t+T3 and t+2*T3.

The one or more patterns may be compared to the noise of the wireless communication medium by being compared to one or more second noise values and/or to one or more third noise values. Based on the comparison, one or more relationships between the noise of the wireless communication medium and the one or more patterns may be determined. A comparison to one or more second noise values may comprise a comparison to one or more second noise values, to one or more differences between one or more second noise values and one or more first noise values, to one or more differences between one or more second noise values and one or more third noise values, and/or to one or more other values based on one or more second noise values. A comparison to one or more third noise values may a comprise to one or more third noise values, to one or more differences between one or more third noise values and one or more first noise values, to one or more differences between one or more third noise values and one or more second noise values, and/or to one or more other values based on one or more third noise values. For ease of discussion, the comparison will be described below with respect to the one or more third noise values, but steps similar to the following description may be performed with regard to other specific comparisons indicated above.

The networking device 301 may compare the one or more patterns to the one or more third noise values by determining features of the one or more third noise values and comparing the features of the one or more third noise values to corresponding features of the one or more patterns. One or more features of the one or more third noise values may be determined by performing one or more signal recognition techniques (rising or falling edge detection, peak detection, thresholding, auto-correlations, Fourier analysis, etc.). The one or more features of the third noise values may comprise one or more periods of one or more periodic features (e.g., periodic peaks of noise level measurements over time), one or more time lengths of peaks (e.g., full width half maximum values or a time length between detected rising and falling edges) and/or time lengths between peaks (e.g., a time length between falling and rising edges). The one or more features of the third noise values may comprise one or more frequency bands associated with peaks in the third noise values (e.g., the peaks may be determined to have consistent central frequencies and/or frequency widths at full-width half maximum, within error of the measurement, within the one or more frequency bands) and/or a pattern of frequency bands associated with the detected peaks over time. The one or more features of the third noise values may comprise an estimated direction or location. For example, the third noise values may be determined based on multiple wireless interfaces at multiple locations. Based on different noise levels of synchronous peaks of the third noise values determined via wireless interfaces at different locations, an estimated direction and/or location associated with the third noise values may be determined.

The networking device 301 may compare the one or more patterns to the one or more third noise values by comparing the one or more features of the third noise values to corresponding features of the one or more patterns. The networking device 301 may determine corresponding features of the one or more patterns based on the information indicating the one or more patterns, and/or the features of the one or more patterns, determined and/or received in step 403. For example, a period of periodic features detected in the third noise levels may be compared to periods of periodic features of the one or more patterns. Based on the comparison, the period of the periodic feature of the third noise level may be determined to be consistent with (e.g., equal to within error of the measurement, within a percentage allowable error such as 5%, 10%, 15%, etc.) a period of a periodic feature of a pattern of the one or more patterns. The pattern may be flagged as sharing the periodic feature with the third noise levels. Each pattern of the one or more patterns comprising periodic features with a period consistent with the period of the third noise levels may be flagged as sharing the feature with the third noise levels. A frequency band associated with one or more peaks in the third noise levels may be compared to frequency bands associated with the one or more patterns (e.g., channels of wireless communication protocols associated with the one or more patterns). Based on the comparison, the period of the frequency band of the second noise level may be determined to be consistent with a frequency band associated with a pattern of the one or more patterns. The pattern may be flagged as sharing the frequency band with the third noise levels. Each feature of the third noise values, determined as above, may be compared to each corresponding feature of the one or more patterns. Alternatively, based on a subset of patterns of the one or more patterns being flagged as sharing a first feature with the third noise values, a second feature of the third noise value may be compared to corresponding features of the subset of flagged patterns, only.

Alternatively, or in addition, the one or more patterns may be compared to the third noise values by determining a statistical similarity (e.g., by determining a cross-correlation, a cross-covariance, a convolution, etc.) between a time series of third noise values and timing features of the pattern. Alternatively, or in addition, one or more third noise values corresponding to different frequencies of a spectrum of the wireless communication medium may be compared with a pattern of the one or more patterns by determining a statistical similarity between the one or more third noise values and spectral features of the pattern.

In step 413, based on the comparison between the one or more patterns and the one or more third noise values, the networking device 301 may determine whether or not one or more of the one or more patterns are detected in the third noise values (e.g., are consistent with the third noise values). A pattern may be determined to be detected in the third noise values (413—Y) based on satisfying one or more detection criteria. The one or more detection criteria may comprise one or more of sharing at least one feature with the third noise values, sharing at least a minimum number of features with the third noise values, sharing one or more specific features with the third noise values and/or sharing one or more features with the third noise values and having no features determined to be inconsistent with (e.g., not equal to within error of the measurement, outside a percentage allowable error such as 5%, 10%, 15%, etc.) corresponding features of the third noise values. The minimum number of features may be based on a number of features of the third noise values, determined in step 411 (e.g., the number of features of the third noise values, half the number of features of the third noise values, etc.). The one or more specific features may be, for example, at least a frequency band of a feature of the third noise values and/or at least a period of a periodic feature of the third noise values.

The one or more detection criteria may comprise detection criteria for detecting a pattern in third noise values comprising a plurality of sets of third noise values associated with a plurality of wireless interfaces. The detection criteria may comprise a criterion of a pattern being detected in a minimum number of the sets of third noise values and/or in a set of third noise values associated with a specific wireless interface. For example, in FIG. 6A, the column titled "Pattern detected" indicates whether a pattern was detected for sets of third noise values associated with antennae 1-4. FIG. 6A indicates that at least one pattern was detected in the sets of third noise values associated with antennae 1-2 and 4. The at least one pattern may be a same pattern and/or different patterns for the sets of third noise values associated with different antennae. FIG. 6A indicates that no pattern was detected in the third noise values associated with antenna 3. A pattern may be determined to be detected in the third noise values (413—Y) based on being detected in at least a minimum number of the sets of third noise values (e.g., at least 1, 2, 3, or 4 of the sets). A pattern may be determined to be detected in the third noise values (413—Y) based on being detected in at least a set of third noise values associated with a specific wireless interface (e.g., at the set associated with a wireless interface comprising antenna 1).

The one or more detection criteria may be different for different patterns of the one or more patterns. One or more detection criteria for a pattern may be based on features of the pattern. For example, based on the information indicating the pattern indicating only two features of the pattern (e.g., a frequency band and a period), the one or more detection criteria for may comprise sharing one or both features with the third noise values. Alternatively, or in addition, the one or more detection criteria for a pattern may be based on a priority level associated with the pattern (e.g., associated with a wireless communication, a wireless communication protocol and/or a device associated with the pattern). A pattern associated with a high priority level may be detected based on fewer detection criteria and/or less stringent detection criteria (e.g. features of the pattern may be consistent with features of the third noise values based on a larger acceptable error) than a pattern associated with a low priority level.

Based on the one or more detection criteria not being satisfied by any pattern of the one or more patterns, a pattern may not be detected (413—N). The networking device may continue to monitor noise of the wireless communication medium according to step 407.

In step 415, based on one or more patterns detected in step 413, the networking device 301 may determine whether any priority levels are associated with the one or more patterns. A priority level may be determined to be associated with a pattern of the one or more patterns based on the pattern being associated with a wireless communication and/or a device having the priority level. For example, the information indicating the pattern and/or the features of the pattern may be stored in a database comprising information about the wireless communication and/or the device. The information may include a priority level of the wireless communication and/or the associated device. Based on a determination that at least one priority level is associated with the one or more detected patterns (415—Y), a priority level may be determined. Based on a determination that multiple priority levels are associated with the one or more detected patterns, a highest priority level of the multiple priority levels may be determined. Based on a determination that no priority levels are associated with the one or more patterns, (415—N), a default priority level may be determined.

In step 417, based on the one or more patterns detected in step 413 and/or the priority level determined in step 415, a power level of at least one of one or more wireless interfaces, one or more devices and/or one or more networks may be reduced. The power level may be reduced by the networking device 301 and/or based on instructions sent via the networking device 301 to one or more of the wireless devices 303a-b, 305a-h or 307a-b and/or the console 309. The one or more of the wireless interfaces may be one or more wireless interfaces associated with a high power wireless communication protocol (e.g., Wi-fi). The one or more wireless interfaces may be one or more wireless interfaces determined to contribute more noise to the wireless communication medium relative to one or more other wireless interfaces. The one or more of the wireless interfaces may be one or more wireless interfaces of a device and/or a wireless communication associated with a priority level lower than the priority level determined in step 415. The one or more of the devices may be one or more devices associated with a high power wireless communication protocol (e.g., Wi-fi). The one or more devices may be one or more devices determined to contribute more noise to the wireless communication medium relative to one or more other devices. The one or more devices may be associated with a lower priority level than the priority level determined in step 415. The one or more of the networks may be one or more networks associated with a high power wireless communication protocol (e.g., Wi-fi). The one or more networks may be one or more networks determined to contribute more noise to the wireless communication medium relative to one or more other networks.

The power level may be reduced for a waiting time period, wherein the waiting time period may be based on one or more timing features of the one or more detected patterns and/or the determined priority level. The power level may be reduced by directly reducing the power level for the one or more wireless interfaces, the one or more devices and/or the one or more networks for the waiting time period. Alternatively, or in addition, the power level may be reduced through implementation of one or more fairness algorithms (e.g., PTA) for the waiting time period. The power level may be reduced by stopping or reducing a number or frequency of signal transmissions of the one or more wireless interfaces, the one or more devices and/or the one or more networks for the waiting period. The power level may be returned to an un-reduced level and/or the fairness algorithm may be re-enabled after the waiting time period. The networking device 301 may receive a wireless communication (e.g., process the wireless communication according to a wireless communication protocol of the wireless communication), and/or receive information indicating a wireless communication was received by another device (e.g., one or more of the network nodes 303a-b), during the waiting time period.

In step 419, the networking device 301 may determine whether or not one or more wireless communications associated with the one or more detected patterns were received during the waiting time period. The received wireless communication may be compared to each pattern of the one or more detected patterns to determine whether or not the wireless communication is consistent with one or more of the patterns. Alternatively, or in addition, the wireless communication may be determined to be a wireless communication associated with one or more of the detected patterns based on the information received in steps 401 and 403. Based on determining that the received wireless communication is consistent with, and/or associated with, a pattern of the one or more detected patterns, the networking device 301 may determine that a wireless communication associated with the pattern was received, and the pattern may be indicated to be associated with a received wireless communication (e.g., removed from a list of detected patterns maintained by the networking device 301, flagged as resolved in the list of detected patterns, etc.). Based on each pattern being indicated as associated with a received wireless communication, the networking device 301 may determine that one or more wireless communications associated with the one or more detected patterns were received during the waiting time period (419—Y). Based on determining that, after the waiting time period, one or more remaining patterns of the one or more detected patterns are not associated with a received wireless communication, the networking device may determine that one or more wireless communications associated with the one or more detected patterns were not received during the waiting time period (419—N).

In step 421, based on determining that a wireless communication is not received for one or more remaining patterns of the one or more detected patterns, the networking device 301 may determine whether or not to wait for an additional waiting time period. The power level may remain reduced and/or be reduced further during the additional waiting time period, and/or the fairness algorithm may remain enabled. The networking device 301 may determine, for each pattern of the one or more remaining patterns, a number of wait attempts. The number of wait attempts for a pattern may be based on a priority level associated with the pattern (e.g., the priority level determined in step 415 and/or a highest priority level associated with the pattern). For example, a greater number of wait attempts may be determined for a pattern associated with a high priority than for a pattern associated with a low priority. Based on a maximum of the number of wait attempts determined for the one or more remaining patterns being one or more, the networking device 301 may determine to wait for an additional waiting time period (421—Y). The additional waiting time period may have a same length as the waiting time period of step 417, and/or the additional waiting time period may be based on a timing feature of the one or more remaining patterns, (e.g., a longest timing feature of the one or more remaining patterns).

The networking device 301 may track the number of wait attempts for each pattern of the one or more remaining patterns. Based on maintaining the reduced power level for the additional waiting time period, the networking device 301 may reduce any non-zero number of wait attempts determined for the one or more remaining patterns by one. The networking device 301 may determine whether or not one or more wireless communications associated with the one or more remaining patterns were received during the additional waiting time period, as in step 419. Based on determining that a received wireless communication is consistent with, and/or associated with, a pattern of the one or more remaining patterns, the networking device 301 may determine that a wireless communication associated with the pattern was received, and the pattern may be indicated to be associated with a received wireless communication (e.g., removed from the list of detected patterns, flagged as resolved in the list of detected patterns, etc.). Based on each pattern of the one or more remaining patterns being indicated as associated with a received wireless communication, the networking device 301 may determine that one or more wireless communications associated with the one or more remaining patterns were received during the additional waiting time period (419—Y). Based on determining that, after the additional waiting time period, at least one of the one or more remaining patterns is not associated with a received wireless communication (419—N), step 421 may be repeated for the at least one remaining pattern, with the number of wait attempts based on the tracked number of wait attempts for the at least one remaining pattern. Based on zero remaining wait attempts for all remaining patterns, the networking device 301 may determine to not to wait for an additional waiting time period (421—N).

In step 423, based on either a wireless communication being received in step 419 (419—Y) and/or a number of wait attempts being exhausted (421—N) for each pattern of the detected patterns, the power level may be returned to an original un-reduced level and/or the fairness algorithm may be disabled. The noise of the wireless communication medium may continue to be monitored according to step 407.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   determining, by a computing device, a pattern associated with wireless communications of a first wireless device of a plurality of wireless devices configured to communicate via a wireless communication medium;
   based on a difference, between one or more first noise values associated with noise in the wireless communication medium during a first time period and one or more second noise values associated with noise in the wireless communication medium during a second time period, satisfying a threshold, determining that a feature of the one or more second noise values is consistent with at least a portion of the pattern; and
   causing, based on the feature being consistent with the portion of the pattern, a decrease in signal transmission via the wireless communication medium by one or more second wireless devices of the plurality of wireless devices.

2. The method of claim 1, wherein the one or more first noise values comprises one or more of:
   a time series of noise levels of the wireless communication medium;
   a spectrum of noise levels of the wireless communication medium;
   a noise level of the wireless communication medium averaged over a portion of the first time period;
   a noise level averaged over a frequency band of the wireless communication medium; or
   one or more noise levels associated with one or more wireless interfaces of the plurality of wireless devices.

3. The method of claim 1, wherein the pattern associated with wireless communications of the first wireless device comprises a plurality of periodic pulses.

4. The method of claim 1, wherein the pattern associated with wireless communications of the first wireless device comprises a plurality of regularly-occurring sets of signal pulses, wherein each of the sets of signal pulses comprises a plurality of regularly-occurring signal pulses.

5. The method of claim 1, wherein the plurality of wireless devices comprise one or more wireless devices associated with sensors of a security system.

6. The method of claim 1, further comprising:
   determining priority levels associated with the plurality of wireless devices,
   wherein the causing the decrease in signal transmission is further based on comparing a priority level associated with the first wireless device to one or more priority levels associated with the one or more second wireless devices.

7. The method of claim 1, wherein the plurality of wireless devices comprise at least two wireless devices that communicate via different protocols and via at least partially overlapping frequency bands.

8. The method of claim 1, wherein:
   the one or more first noise values comprise an average of noise levels at one or more of the one or more second wireless devices, and
   the one or more second noise values comprise an average of noise levels at one or more of the one or more second wireless devices.

9. The method of claim 1, wherein:
   the one or more first noise values comprise a noise level within a frequency band associated with a wireless communication channel, and
   the one or more second noise values comprise a noise level within the frequency band associated with the wireless communication channel.

10. The method of claim 1, further comprising:
    receiving, via one or more of the plurality of wireless devices, an indication of a missed wireless communication of the wireless communications, and
    comparing, based on receiving the indication of the missed wireless communication, the feature with the at least the portion of the pattern.

11. The method of claim 1, wherein the determining the pattern comprises:
reducing a power level of one or more wireless devices of the plurality of wireless devices; and
receiving one or more signals having one or more patterns comprising the pattern.

12. The method of claim 1, further comprising:
causing, after a time period associated with the pattern, an increase in signal transmission via the wireless communication medium by the one or more second wireless devices of the plurality of wireless devices;
determining that a wireless communication was not received via the first wireless device; and
based on a priority level associated with the first wireless device, causing a second decrease in signal transmission via the wireless communication medium by the one or more second wireless devices of the plurality of wireless devices.

13. A method comprising:
determining, by a computing device, one or more first noise values associated with noise in a wireless communication medium during a first time period;
determining one or more second noise values associated with noise in the wireless communication medium during a second time period;
based on a difference between the one or more first noise values and the one or more second noise values satisfying a threshold, determining a relationship between one or more third noise values, associated with noise in the wireless communication medium during a third time period, and a pattern associated with wireless communications, via the wireless communication medium, of a first wireless device; and
causing, based on the relationship, a decrease of signal transmission, via the wireless communication medium, of one or more second wireless devices.

14. The method of claim 13, further comprising, prior to the determining the relationship, determining the pattern.

15. The method of claim 13, further comprising determining the one or more third noise values at a sampling rate based on an association between the pattern and the threshold.

16. The method of claim 13, further comprising, prior to the determining the relationship, receiving information indicating the pattern and one or more of:
information indicating a location of the first wireless device;
a protocol associated with the first wireless device; or
a priority of the first wireless device.

17. A method comprising:
determining, by a computing device, a pattern associated with wireless communications of a first wireless device of a plurality of wireless devices configured to communicate via a wireless communication medium;
receiving information indicating priority levels associated with the plurality of wireless devices;
determining a relationship between one or more noise values, associated with noise in the wireless communication medium during a first time period, and at least a portion of the pattern; and
causing, based on the relationship and a priority level associated with the first wireless device, a decrease in signal transmission via the wireless communication medium by one or more second wireless devices of the plurality of wireless devices.

18. The method of claim 17, wherein the determining the relationship is based on a difference, between one or more of the one or more noise values and one or more second noise values associated with noise in the wireless communication medium during a second time period, satisfying a threshold.

19. The method of claim 17, further comprising:
selecting the one or more second wireless devices based on priority levels associated with the second wireless devices being lower than the priority level associated with the first wireless device.

20. The method of claim 17, wherein the decrease in signal transmission via the wireless communication medium is caused for a time period based on the priority level associated with the first wireless device.

* * * * *